(12) United States Patent
Peterson et al.

(10) Patent No.: US 11,904,773 B2
(45) Date of Patent: Feb. 20, 2024

(54) METHOD OF ASSEMBLING MIRROR REFLECTIVE ELEMENT SUB-ASSEMBLY FOR EXTERIOR REARVIEW MIRROR ASSEMBLY

(71) Applicant: Magna Mirrors of America, Inc., Holland, MI (US)

(72) Inventors: Kenneth C. Peterson, Ada, MI (US); Matthew S. Van Oeveren, Hudsonville, MI (US); Jeffrey R. Westbrook, Lowell, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/186,326

(22) Filed: Mar. 20, 2023

(65) Prior Publication Data

US 2023/0242035 A1  Aug. 3, 2023

Related U.S. Application Data

(63) Continuation of application No. 16/947,186, filed on Jul. 22, 2020, now Pat. No. 11,607,997.

(60) Provisional application No. 62/878,407, filed on Jul. 25, 2019.

(51) Int. Cl.
*B60R 1/00* (2022.01)
*B60R 1/06* (2006.01)
*B60R 1/12* (2006.01)

(52) U.S. Cl.
CPC .............. *B60R 1/006* (2013.01); *B60R 1/06* (2013.01); *B60R 1/1207* (2013.01); *B60R 2001/1215* (2013.01)

(58) Field of Classification Search
CPC ......... B60R 1/006; B60R 1/06; B60R 1/1207; B60R 2001/1215
See application file for complete search history.

(56) References Cited

U.S. PATENT DOCUMENTS

| | | |
|---|---|---|
| 4,435,042 A | 3/1984 | Wood et al. |
| 4,436,371 A | 3/1984 | Wood et al. |
| 4,826,289 A | 5/1989 | Vandenbrink et al. |
| 4,948,242 A | 8/1990 | Desmond et al. |
| 5,327,288 A | 7/1994 | Wellington et al. |
| 5,371,659 A | 12/1994 | Pastrick et al. |
| 5,446,576 A | 8/1995 | Lynam et al. |

(Continued)

*Primary Examiner* — Howard D Brown, Jr.
*Assistant Examiner* — Tyler B Edwards
(74) *Attorney, Agent, or Firm* — HONIGMAN LLP (57) ABSTRACT

A method for assembling a mirror reflective element sub-assembly for a vehicular exterior rearview mirror assembly includes assembling an indicator module by heat staking a printed circuit board at a receiving part of a housing to form a housing and printed circuit board assembly and dispensing potting material at the printed circuit board to seal the printed circuit board at the housing and aligning and taping a diffuser at the housing. A back plate is provided that has an indicator attaching portion for attaching the indicator module. The back plate is placed at a support fixture and a mirror reflective element is attached at the back plate. The indicator module is attached at the indicator attaching portion of the back plate. Light emitted by the indicator module, when electrically powered to emit light, passes through the mirror reflective element at an aperture of the back plate.

46 Claims, 9 Drawing Sheets

(56) References Cited

U.S. PATENT DOCUMENTS

| | | |
|---|---|---|
| 5,497,306 A | 3/1996 | Pastrick |
| 5,555,136 A | 9/1996 | Waldmann et al. |
| 5,582,383 A | 12/1996 | Mertens et al. |
| 5,610,756 A | 3/1997 | Lynam et al. |
| 5,669,699 A | 9/1997 | Pastrick et al. |
| 5,680,263 A | 10/1997 | Zimmermann et al. |
| 5,786,772 A | 7/1998 | Schofield et al. |
| 5,808,777 A | 9/1998 | Lynam et al. |
| 5,823,654 A | 10/1998 | Pastrick et al. |
| 5,929,786 A | 7/1999 | Schofield et al. |
| 5,984,482 A | 11/1999 | Rumsey et al. |
| 6,176,602 B1 | 1/2001 | Pastrick et al. |
| 6,198,409 B1 | 3/2001 | Schofield et al. |
| 6,227,675 B1 | 5/2001 | Mertens et al. |
| 6,227,689 B1 | 5/2001 | Miller |
| 6,229,319 B1 | 5/2001 | Johnson |
| 6,276,821 B1 | 8/2001 | Pastrick et al. |
| 6,315,421 B1 | 11/2001 | Apfelbeck et al. |
| 6,318,870 B1 | 11/2001 | Spooner et al. |
| 6,582,109 B2 | 6/2003 | Miller |
| 6,598,980 B2 | 7/2003 | Marusawa et al. |
| 6,690,268 B2 * | 2/2004 | Schofield ............ B60Q 1/2665 348/148 |
| 6,882,287 B2 | 4/2005 | Schofield |
| 7,038,577 B2 | 5/2006 | Pawlicki et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,400,435 B2 | 7/2008 | Byers et al. |
| 7,420,756 B2 | 9/2008 | Lynam |
| 7,492,281 B2 | 2/2009 | Lynam et al. |
| 7,581,859 B2 | 9/2009 | Lynam |
| 7,626,749 B2 | 12/2009 | Baur et al. |
| 7,720,580 B2 | 5/2010 | Higgins-Luthman |
| 8,049,640 B2 | 11/2011 | Uken et al. |
| 8,058,977 B2 | 11/2011 | Lynam |
| 8,173,936 B2 | 5/2012 | Rawlings |
| 8,242,896 B2 | 8/2012 | Lynam |
| 8,277,059 B2 | 10/2012 | McCabe et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,764,256 B2 | 7/2014 | Foote et al. |
| 9,346,403 B2 | 5/2016 | Uken et al. |
| 9,481,304 B2 | 11/2016 | Dykhouse |
| 9,598,016 B2 | 3/2017 | Blank et al. |
| 10,259,392 B2 * | 4/2019 | Rawlings ............ B60R 1/082 |
| 11,607,997 B2 | 3/2023 | Peterson et al. |
| 2005/0195488 A1 * | 9/2005 | McCabe ............ G02B 5/085 359/603 |
| 2009/0115631 A1 * | 5/2009 | Foote ............ B60R 1/0602 340/901 |
| 2010/0321758 A1 * | 12/2010 | Bugno ............ G02F 1/1533 359/267 |
| 2013/0242586 A1 | 9/2013 | Huizen et al. |
| 2014/0313563 A1 | 10/2014 | Uken et al. |
| 2015/0097955 A1 | 4/2015 | De Wind et al. |
| 2017/0205679 A1 * | 7/2017 | Kendall ............ B60R 1/088 |

* cited by examiner

FIG. 5
Select Heaterpad. Remove Liner on Glasscase side and place using the 4-way 2-way locator pins FIG. 6
Align to the 4-way and 2-way locator posts on the alignment Fixture. Remove glass sub from Alignment Fixture FIG. 4
Assemble Alignment Fixture with the 4-way 2-way locator pins

FIG. 7

Remove Heaterpad Liner on glass side and select glass. Assemble glass to backplate & heater pad to make the 'glass sub assembly'

FIG. 8

Load Sub into Laser Ablation nest using the Glasscase 4-way / 2-way locator. Laser ablate the BZI icon on the Glass surface

FIG. 9

Select Glass and BZI Module. Remove release liner from module. Align BZI Module to 4-way / 2-way locator pins and snap into the Glass case

FIG. 10

FIG. 11A
Select BSM Housing

FIG. 11B
Select PCBA. Settle the PCBA into housing

FIG. 11C
Put the Housing + PCBA sub-Assy on the heat staking fixture

FIG. 11D
Put the Housing + PCBA sub-Assy on the potting tray and potting

FIG. 11F

Assemble diffuser attachment tape, diffuser, mask, and release liner together. Align tape to the Housing sub-Assy periphery with taping fixture

FIG. 11E

Put the Housing sub-Assy on the taping fixture

FIG. 11G

Verify current draw using EOLT

METHOD OF ASSEMBLING MIRROR REFLECTIVE ELEMENT SUB-ASSEMBLY FOR EXTERIOR REARVIEW MIRROR ASSEMBLY

CROSS REFERENCE TO RELATED APPLICATIONS

The present application is a continuation of U.S. patent application Ser. No. 16/947,186, filed Jul. 22, 2020, now U.S. Pat. No. 11,607,997, which claims priority of U.S. provisional application Ser. No. 62/878,407, filed Jul. 25, 2019, which is hereby incorporated herein by reference in its entirety.

FIELD OF THE INVENTION

The present invention relates generally to the field of rearview mirror assemblies for vehicles.

BACKGROUND OF THE INVENTION

It is known to provide an automotive rearview mirror assembly that includes one or more accessories, such as a light source or blind spot indicator or turn signal indicator. The mirror reflective element of such known mirror assemblies include a mirror reflector coating that is vacuum deposited or sputter coated onto a surface of a glass substrate of the mirror reflective element and typically includes visual indicators such as turn signal indicators and blind zone indicators that indicate to a driver presence of another overtaking vehicle in a side lane adjacent to the equipped vehicle.

SUMMARY OF THE INVENTION

The present invention provides a method or process or system for assembling a mirror reflective element sub-assembly for a vehicular exterior rearview mirror assembly utilizing nest fixtures and locator pins and corresponding apertures to ensure alignment of the components during the assembly process and the indicator icon forming process. The system or method uses a support fixture having locator pins disposed at apertures thereof and protruding therefrom, with a heater pad disposed at the support fixture such that the locator pins protrude through or are received in or through corresponding apertures of the heater pad to align the heater pad at the support fixture. A back plate is disposed at the heater pad and support fixture, such that the locator pins protrude through or are received in or through corresponding apertures of the back plate to align the back plate at the heater pad at the support fixture. The back plate is attached at the heater pad and the back plate and heater pad construction is removed from the support fixture and a mirror reflective element is attached at the back plate and heater pad construction. A laser ablation fixture is provided that includes locator pins disposed at apertures thereof and protruding therefrom. The mirror reflective element and back plate and heater pad construction is disposed at a laser ablation nest or fixture, such that the locator pins of the laser ablation fixture protrude through or are received in or through the apertures of the back plate to align the reflective element and back plate and heater pad construction at the laser ablation fixture. An indicator icon is established (via laser ablation) through the mirror reflector of the mirror reflective element. After the indicator icon is laser ablated through the mirror reflector, the reflective element and back plate and heater pad construction is removed from the laser ablation fixture and an indicator module is snap-attached at a receiving portion of the back plate, whereby the indicator module is aligned with the indicator icon laser ablated through the mirror reflector.

These and other objects, advantages, purposes and features of the present invention will become apparent upon review of the following specification in conjunction with the drawings.

DESCRIPTION OF THE PREFERRED EMBODIMENTS

Figure 1:
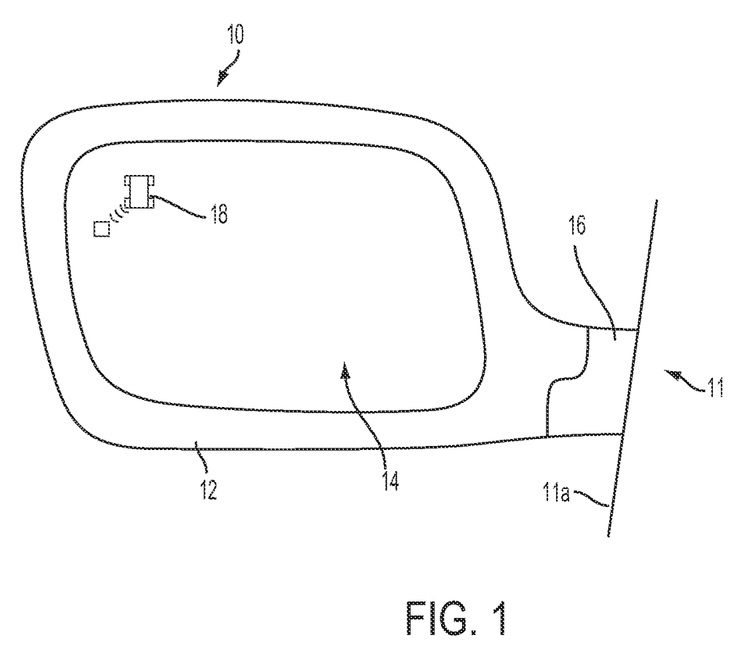
FIG. 1 is a view of an exterior rearview mirror assembly in accordance with the present invention.
Figure 2:
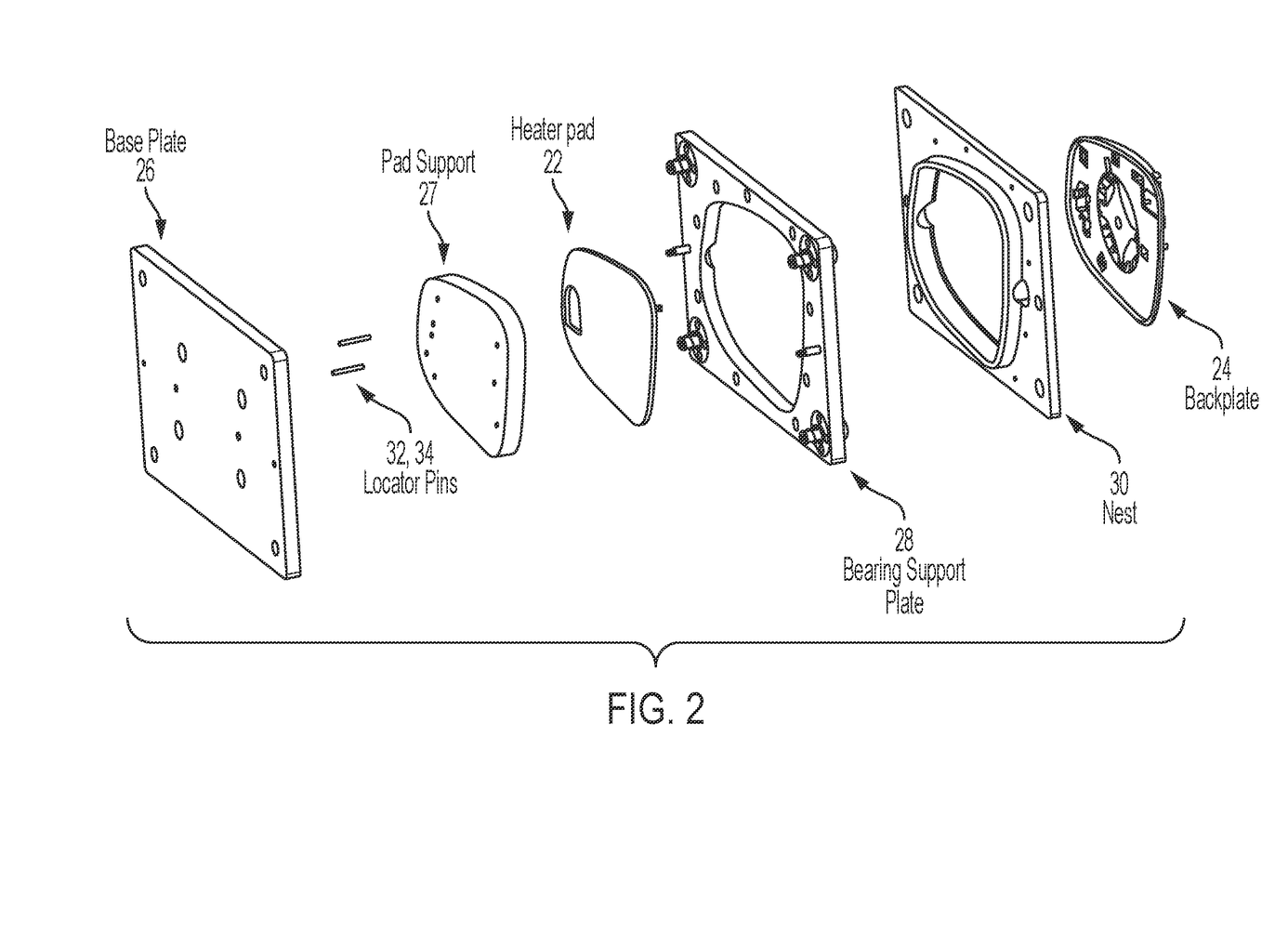
FIG. 2 is an exploded view of an assembly fixture for assembling the back plate and heater pad sub-assembly.
Figure 10:
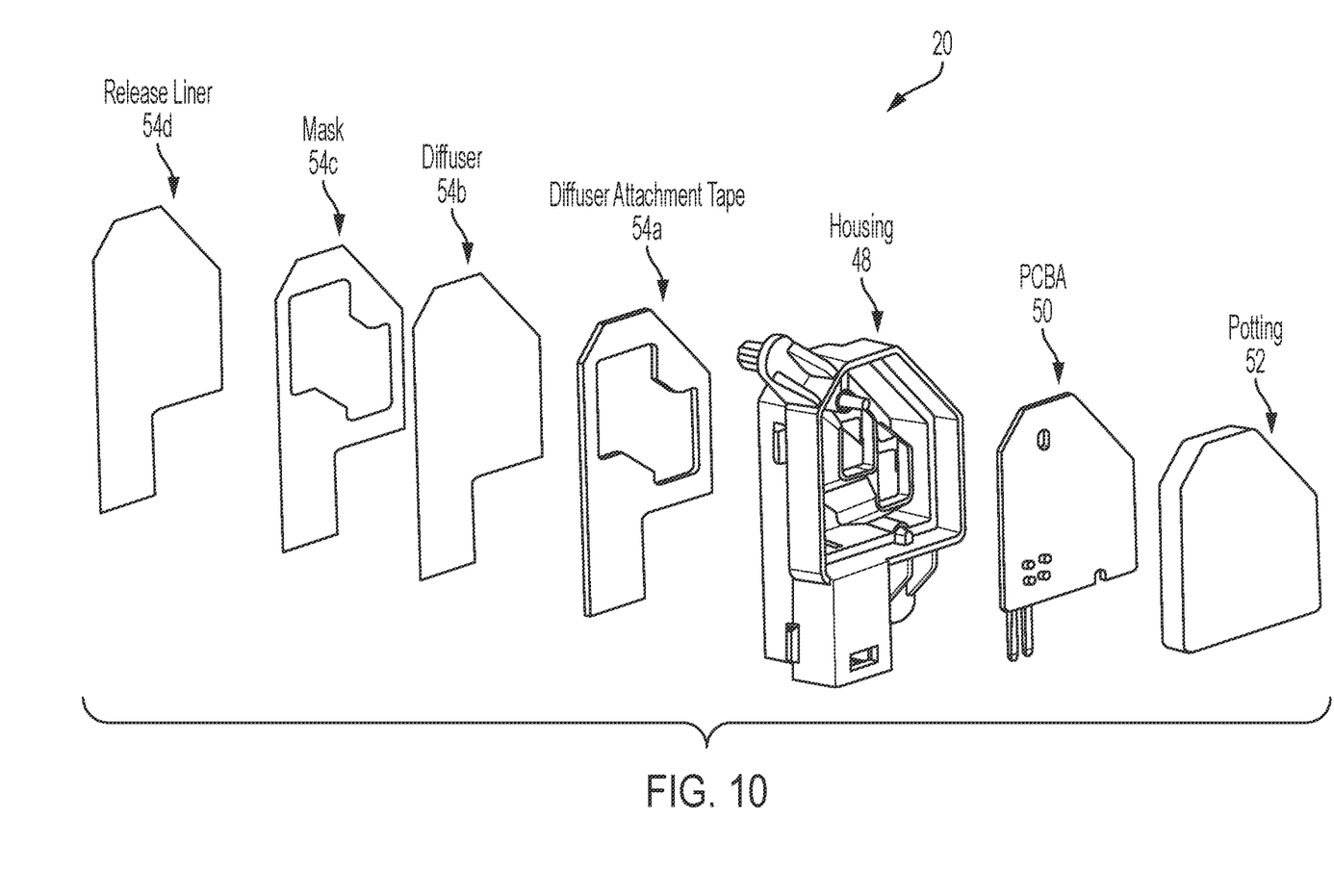
FIG. 10 is an exploded view of the blind zone indicator module.

Referring now to the drawings and the illustrative embodiments depicted therein, an exterior rearview mirror assembly 10 for a vehicle 11 includes a mirror reflective element 12 received in and/or supported at or by a mirror shell or casing or head portion 14 (FIG. 1). The mirror casing or head portion 14 may be fixedly attached at a mounting arm or base 16 at the side of the vehicle or may be movably mounted to a mounting arm or base or portion 16, and may comprise a breakaway mirror (where the mirror head portion may be manually pivoted about the mounting arm or base) or may comprise a powerfold mirror (where the mirror head portion may be pivoted via an actuator assembly or adjustment device). Mounting arm or base 16 of mirror assembly 10 is mounted at the side 11a of a host or subject vehicle 11, with the reflective element 12 providing a rearward field of view along the respective side of the vehicle to the driver of the vehicle, as discussed below. A blind spot indicator icon 18 is established at the reflective element 14 (such as by laser ablating the mirror reflector at the glass substrate of the reflective element), with an indicator module 20 (FIGS. 10 and 11G) disposed behind the mirror reflective element at the indicator icon 18.

In the illustrated embodiment, the coated glass substrate (coated with a mirror reflector at a side or surface thereof) of the mirror reflective element has a heater pad 22 disposed at its rear surface, and a back plate 24 attached at the heater pad and/or glass substrate, such that the heater pad is sandwiched between the back plate and the glass substrate. The back plate and heater pad each have an aperture through which the indicator module 20 emits light that passes through the mirror reflective element at the indicator icon 18 for viewing by the driver of the vehicle equipped with the exterior rearview mirror assembly. The mirror back plate comprises a plastic injection-molded back plate having a generally planar attaching surface (to which the heater pad is adhered) and an opposite side or surface that is formed (via plastic injection molding) for attachment of the mirror reflective element sub-assembly to an actuator of an exterior rearview mirror assembly. The mirror back plate may be formed or molded with a circumscribing lip around a perimeter of the attaching side or surface, whereby the lip circumscribes the peripheral edge of the mirror reflective element or glass substrate adhered to the heater pad. Optionally, the back plate may not include such a lip, whereby the perimeter edge of the mirror glass substrate may be rounded (such as with a radius of curvature of at least 2.5 mm) and exposed to provide a continuous transition between the planar front surface of the glass substrate to a side perimeter surface of the back plate or of the mirror casing.

Figure 3:
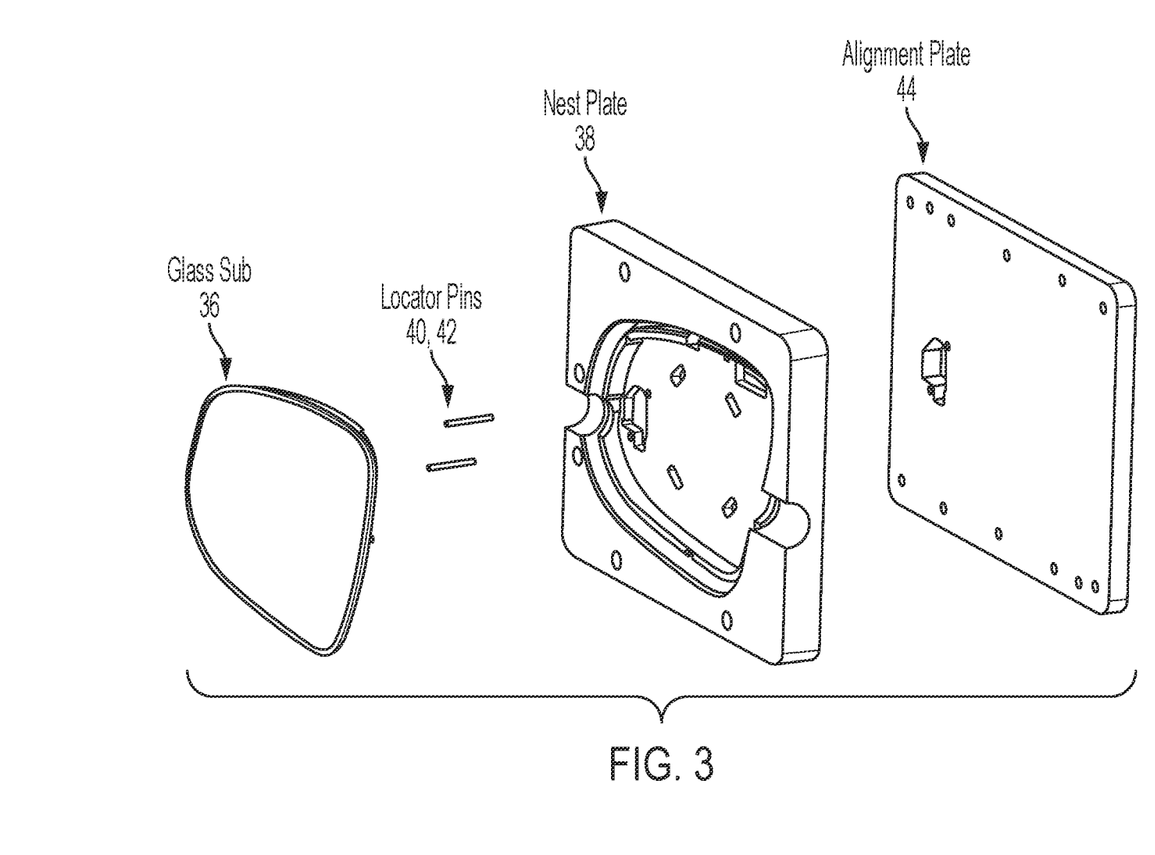
FIG. 3 is an exploded view of a fixture for holding the mirror reflective element sub-assembly for laser ablating the indicator icon.
Figure 4:
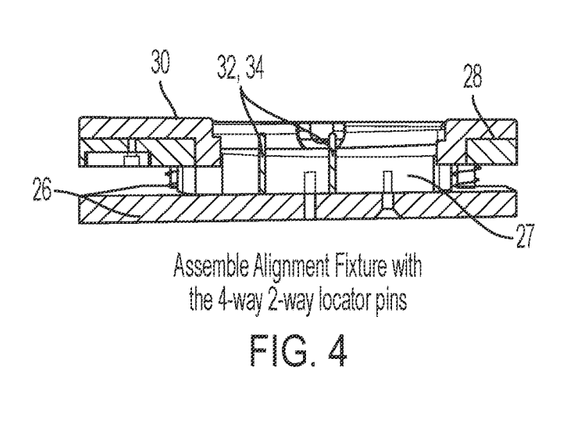
FIG. 4 is a sectional view of the alignment fixture of the assembly fixture of FIG. 2.
Figure 5:
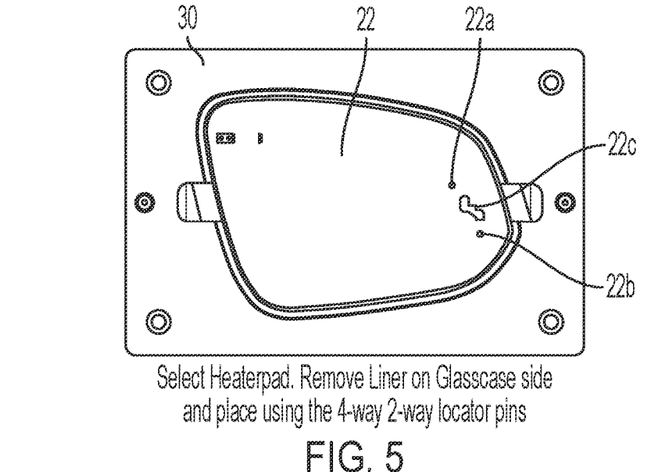
FIG. 5 is a plan view of the alignment fixture, with a heater pad disposed thereat.
Figure 6:
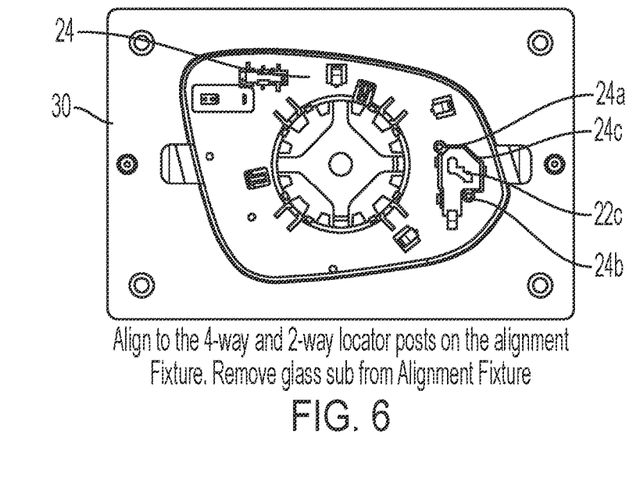
FIG. 6 is a plan view of the alignment fixture, with a back plate disposed at the heater pad.
Figure 7:
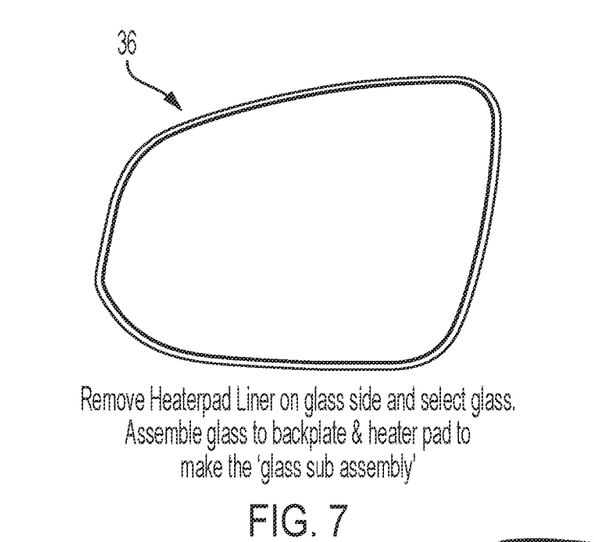
FIG. 7 is a plan view of the mirror reflective element sub-assembly.

During assembly of the mirror reflective element sub-assembly (comprising the mirror reflective element and heater pad and back plate), and as can be seen with reference to FIGS. 2-9, a base plate 26, pad support 27, bearing support plate 28 and nest 30 are provided to align and retain the components during the assembly process that forms the reflective element sub-assembly. As shown in FIGS. 4 and 5, the alignment fixture is assembled with a 4-way locator pin 32 (which precludes relative movement in four directions) and a 2-way locator pin 34 (which precludes relative movement in two directions, while allowing relative movement in two opposite directions, such as via a pin being received in a small slot), with the pins 32, 34 protruding from the base plate 26, through corresponding apertures in the pad support 27 so as to be at a heater pad support surface of the pad support 27. The heater pad 22 is selected and placed at the alignment fixture and aligned using the locator pins 32, 34, which are received through apertures 22a, 22b through the heater pad 22. A liner or film or cover element is removed from the rear side of the heater pad and the back plate 24 is aligned (using the locator pins 32, 34 and apertures 24a, 24b of the back plate 24) at the heater pad and alignment fixture and adhered to the heater pad (FIG. 6). When aligned and attached, the receiving portion 24c (for receiving the indicator module 20) of the back plate 24 (that receives the indicator module 20 therein) is aligned with the icon aperture 22c of the heater pad. As can be seen with reference to FIG. 6, the icon aperture 22c of the heater pad is within and aligned with the aperture of the receiving portion 24c of the back plate.

The back plate and heater pad sub-assembly is then removed from the alignment fixture and the coated glass substrate (the reflective element) is adhered to the heater pad after the liner from the front side of the heater pad has been removed (FIG. 7) to form the reflective element sub-assembly 36. The positioning of the reflective element at the back plate may be established via a lip at the back plate that circumscribes the perimeter edge of the reflective element or via other suitable means. The positioning of the reflective element need not be as precise as the relative positioning of the heater pad and back plate, since the icon or aperture has not yet (at the time the reflective element is attached at the back plate) been established at or through the mirror reflector coating of the mirror reflective element.

Figure 8:
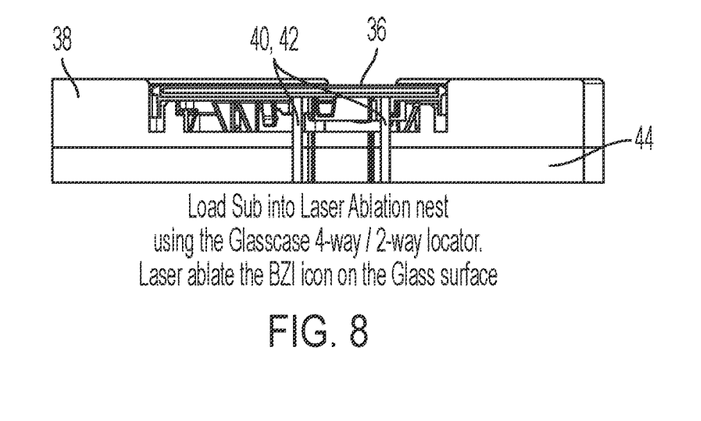
FIG. 8 is a sectional view of the fixture holding the mirror reflective element sub-assembly for the laser ablation process.
Figure 9:
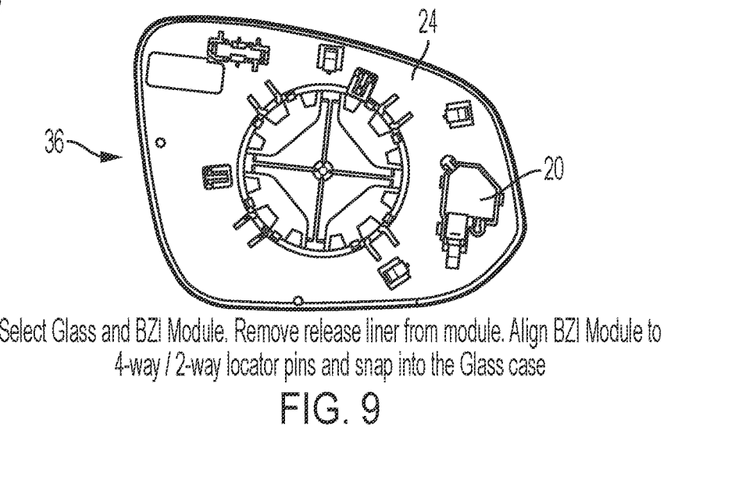
FIG. 9 is a plan view of the completed mirror reflective element sub-assembly, with a blind zone indicator module attached at the back plate.

After the reflective element sub-assembly is assembled, the sub-assembly 36 is loaded into a nest plate 38 (FIGS. 3 and 8) and aligned thereat via locator pins 40, 42 that are received at the same apertures of the back plate as locator pins 32, 34 were during the assembly process. The sub-assembly is disposed at a recess of the nest plate, with the back plate received in the recess and the reflective element exposed. The locator pins 40, 42 protrude from the alignment plate 44 and are received in and through corresponding apertures of the nest plate 38 so as to be received through the apertures 24a, 24b of the back plate 24 as the sub-assembly 36 is loaded into the nest plate 38. The locator pins 40, 42 comprise 2-way and 4-way locator pins that are received through corresponding apertures in the nest plate 38 and in the alignment plate 44. As shown in FIGS. 3 and 8, the nest plate 38 is aligned with the alignment plate 44 (via the locator pins) such that the apertures (including the apertures for the locator pins and the aperture for the indicator module and indicator icon) of the back plate align with the apertures at the nest plate and alignment plate. The nest or recess holds the sub-assembly by the profile of the back plate and reflective element (so that the sub-assembly does not move laterally or in the x or y direction relative to the nest plate) and optionally may include vacuum suction or suction cups 39 (FIG. 12), and may include a suction port that connects to a vacuum supply line 39a, to hold the sub-assembly in the z-direction (so the sub-assembly does not move upward and out of the nest plate) during the laser ablation process.

Figure 12:
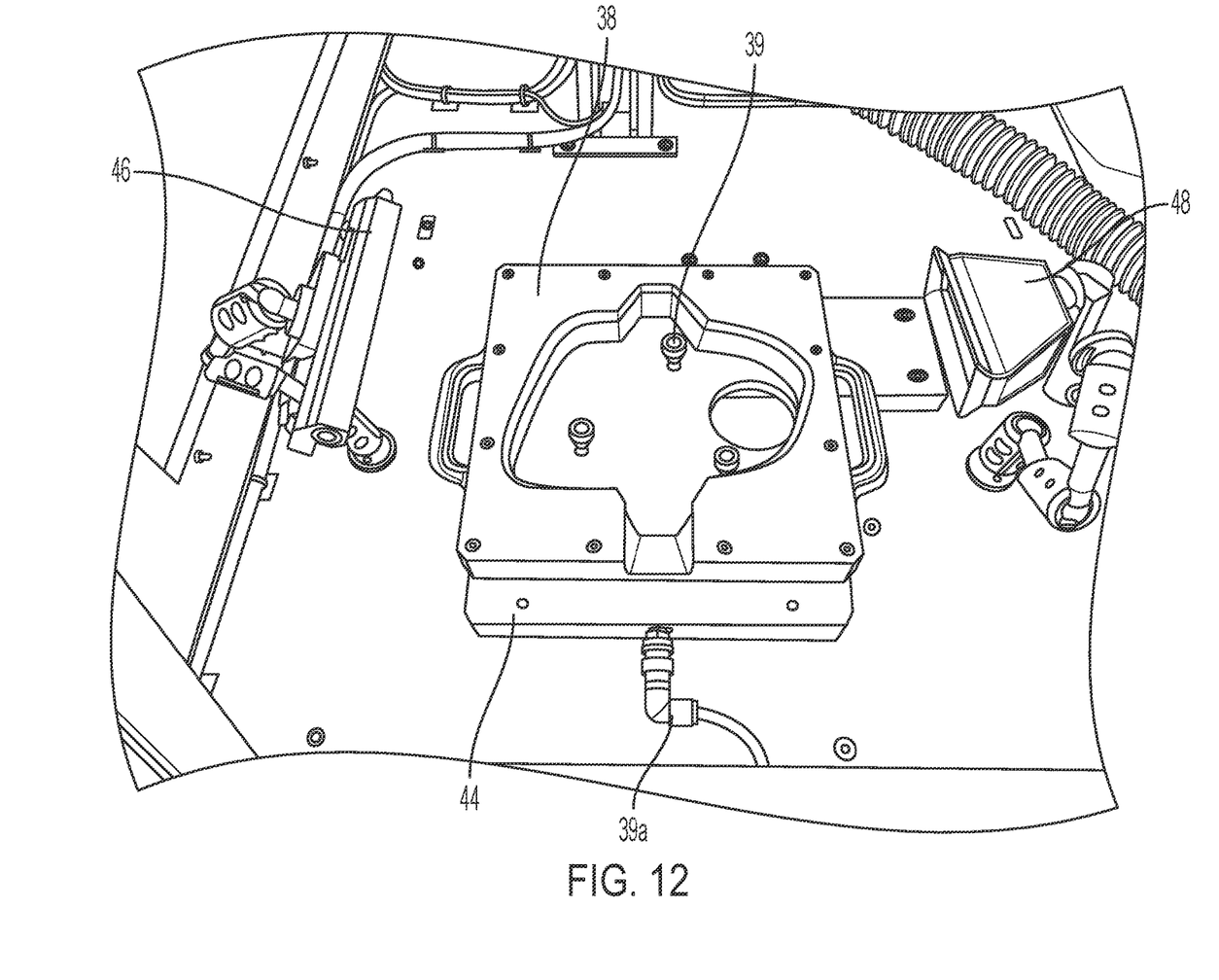
FIG. 12 is a perspective view of the alignment fixture.

After the sub-assembly is loaded into the nest plate, the sub-assembly is positively located and fixed relative to the nest plate and alignment plate with a laser ablation tool or device also positively positioned relative to the nest plate and alignment plate (and having a known location relative to the alignment plate). The laser ablation tool or device is operated to laser ablate (establish) the indicator icon shape at a set location relative to the alignment plate and thus at the appropriate location on the reflective element relative to the icon aperture of the heater pad. The laser ablation tool or device may operate to laser ablate the indicator icon shape from the first surface reflector of the reflective element (such as a thin metallic light-reflecting layer established or coated or deposited at the front or first surface of the glass substrate that is closer to the driver of the vehicle when the mirror assembly is mounted at the vehicle). In other words, the indicator icon is formed through the mirror reflector by removing a portion of the mirror reflector from the surface of the glass substrate that faces away from the back plate (and that is facing upward in FIG. 8). Optionally, and such as shown in FIG. 12, the system may include an air knife 46 at one side of the fixture or nest plate and a vacuum 48 at the other side of the fixture or nest plate, whereby the air knife blows forced air across the surface of the reflective element to remove particulates that get emitted or removed from the coated glass surface during the laser ablation process, with the vacuum drawing the air and particulates in so the particulates are removed from the reflective element.

The icon is thus formed at the mirror reflective element at a precise location relative to the indicator module receiving portion of the back plate (as is known via the location of the locator pins and location of the alignment plate relative to the laser ablation device). After the indicator icon is formed (via laser ablation) at the reflector-coated surface of the mirror reflective element, the sub-assembly is removed from the nest and a blind zone indicator or blind spot indicator module 20 is selected and snapped into the receiving portion at the rear of the back plate (see FIG. 9).

Thus, the nests and plates provide for precise alignment of the back plate with the heater pad, and precise positioning of the sub-assembly (with the mirror reflective element attached at the back plate and heater pad) relative to the laser ablation device, such that the laser ablation of the icon at and through the reflector coating is at a precise location relative to the pin-receiving apertures formed through the heater pad and the back plate and relative to the icons or indicator apertures at the heater pad and the back plate. In the illustrated embodiment, the pins and the pin-receiving apertures are established at and adjacent to the indicator module aperture (such as at corners of the aperture).

In the illustrated embodiment, the indicator icon is established through a first surface reflector coating at the outermost surface of the glass substrate of the mirror reflective element, with the aperture through the nest plate being at and behind the laser ablating area so that the laser doesn't etch the fixture over time and repeated use. Optionally, the indicator icon may be formed through a mirror reflector at the rear surface of the coated glass substrate that faces toward the back plate. In such a configuration, the laser ablation device accesses the coated rear surface of the glass substrate through the apertures formed through the alignment plate and the nest plate (and through the indicator module receiving structure and aperture of the back plate and through the indicator aperture of the heater pad).

Figure 11A:
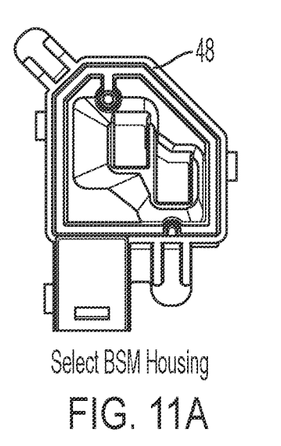
FIGS. 11A-G show the process of assembling the blind zone indicator module.
Figure 11B:
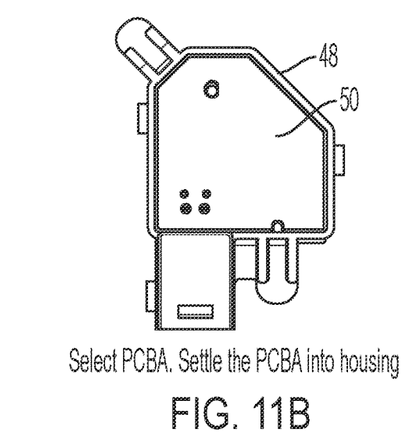
Figure 11C:
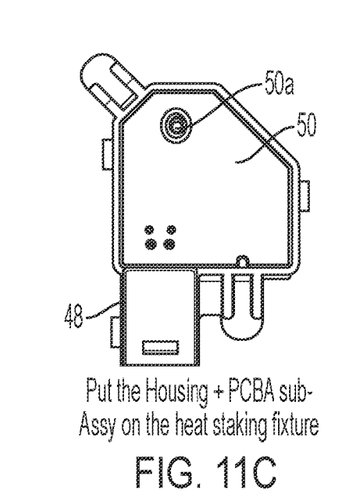
Figure 11D:
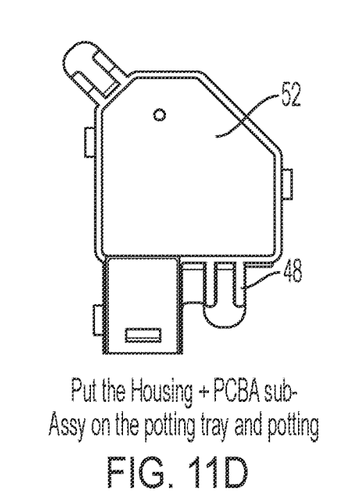
Figure 11E:
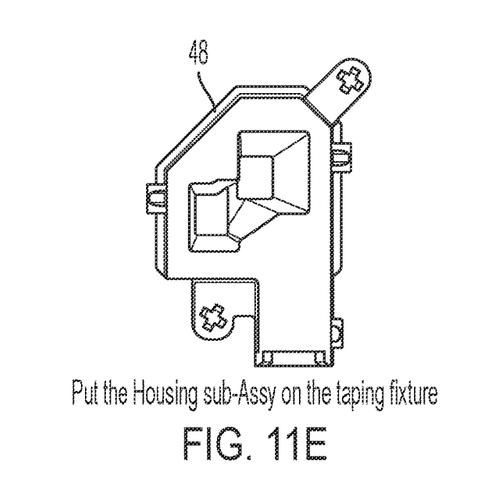
Figure 11F:
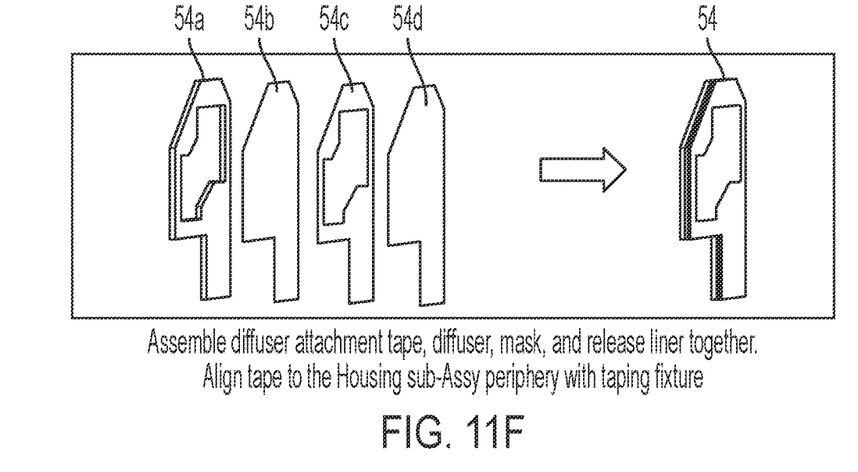
Figure 11G:
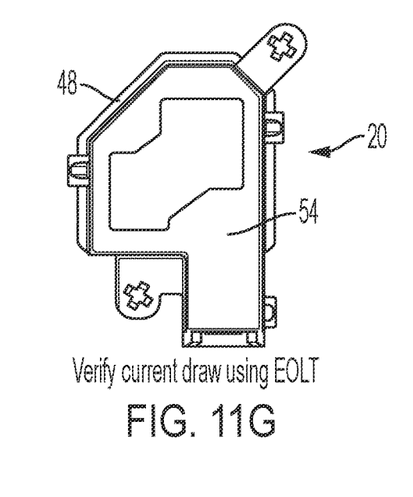

As shown in FIGS. 10 and 11A-G, the indicator module 20 includes a housing 48 (FIG. 11A), and a selected printed circuit board assembly (PCBA) 50 is settled in or disposed into a rear receiving part of the housing (FIG. 11B). The housing and PCBA sub-assembly is placed on a heat staking fixture to heat stake (such as at location 50a) the PCBA at the housing (FIG. 11C). The housing and PCBA sub-assembly is then put on a potting tray and potting material 52 is added to seal the PCBA in the housing (FIG. 11D). The housing and PCBA sub-assembly (with potting material) is then moved to a taping fixture (FIG. 11E) where the diffuser assembly 54 is applied. As shown in FIG. 11F, the diffuser attachment tape 54a, diffuser 54b, mask 54c and release liner 54d are assembled together (FIG. 11F) and aligned and taped at the front side of the housing at the taping fixture (FIG. 11G). The assembled indicator module 20 is then tested using end of line testing (EOLT) to verify current draw and then, when selected during assembly of the reflective element sub-assembly, the indicator module is snapped into the receiving portion at the rear of the back plate.

Therefore, the assembly process of the present invention utilizes locator pins and a nest and support fixture for aligning and retaining the heater pad and back plate during attachment of the heater pad at the front side of the back plate, and utilizes locator pins and a nest and alignment fixture for aligning and retaining the mirror reflective element sub-assembly during the laser ablation of the mirror reflector to establish an indicator icon at the reflective element. The locator pins comprise a 2-way locator pin (that locates and limits movement in two lateral direction and that allows movement in the other lateral direction, such as by being received in a slotted aperture) and a 4-way locator pin (that locates and limits movement in all lateral directions, such as by being received in an aperture that is sized and shaped to correspond with the cross dimension and shape of the pin). The locator pins of the support fixture function in the same manner as the locator pins of the laser ablation fixture, such that the icon region of the reflective element and heater pad are aligned with the back plate aperture or receiving portion, such that the icon is established through the mirror reflector at the correct and precise location for light emitted by the indicator module to pass therethrough when the mirror assembly is mounted at a vehicle. The two-way locator pin allows some slight adjustment to align the four-way locator pin with the aperture(s) to properly and accurately set and retain the components in the respective fixtures for assembly and/or laser ablation. After the sub-assembly is held at the laser ablation station, the icon is laser ablated at the reflector and the sub-assembly is removed from the nest plate and the indicator module is attached (such as snap-attached) at the rear of the back plate.

The indicator module may utilize aspects of the indicators and/or light modules and/or systems described in U.S. Pat. Nos. 8,764,256; 8,242,896; 7,720,580; 7,626,749; 7,581,859; 7,492,281; 7,038,577; 6,882,287; 6,582,109; 6,276,821; 6,227,689; 6,198,409; 6,176,602; 5,929,786; 5,823,654; 5,786,772, 5,669,699; 5,497,306 and/or 5,371,659, and/or U.S. Publication No. US-2013-0242586, which are hereby incorporated herein by reference in their entireties.

The heater pad or element at the rear surface of the glass substrate may comprise a mirror defrost/demisting heater and may provide an anti-fogging of de-fogging feature to the exterior mirror assembly, and may utilize aspects of the heater elements or pads described in U.S. Pat. Nos. 9,481,304; 8,173,936; 8,058,977; 7,400,435; 5,808,777; 5,610,756 and/or 5,446,576, which are hereby incorporated herein by reference in their entireties.

The glass substrate (that is coated with the mirror reflector and fixtured via the alignment fixtures and laser ablated as discussed above) may comprise a single glass substrate for a single substrate non-electro-optic or non-variably reflectant reflective element, such as a flat glass substrate or curved glass substrate with a first (front) surface mirror reflector (disposed at the first or front or outermost side or surface of the glass substrate) or with a second (rear) surface mirror reflector (disposed at the second or rear side or surface of the glass substrate). Optionally, the glass substrate (that is coated with the mirror reflector and fixtured via the alignment fixtures and laser ablated as discussed above) may comprise a rear glass substrate for an electro-optic or electrochromic reflective element, whereby a front glass substrate is mated with the rear glass substrate (with an electro-optic medium sandwiched therebetween) to form an electro-optic mirror reflective element or cell.

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108), or such as a mirror assembly having a rear substrate of an electro-optic or electrochromic reflective element nested in the mirror casing, and with the front substrate having curved or beveled perimeter edges, or such as a mirror assembly having a single substrate reflective element that is disposed at an outer perimeter edge of the mirror casing and with the single glass substrate having curved or rounded perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The rearview mirror assembly may comprise a mirror assembly of the types described in U.S. Pat. Nos. 7,420,756; 7,289,037; 7,274,501; 7,338,177; 7,255,451; 7,249,860; 6,318,870; 6,598,980; 5,327,288; 4,948,242; 4,826,289; 4,436,371 and 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (which are hereby incorporated herein by reference in their entireties), that can benefit from the present invention.

Changes and modifications in the specifically described embodiments may be carried out without departing from the principles of the present invention, which is intended to be limited only by the scope of the appended claims as interpreted according to the principles of patent law.

The invention claimed is:

1. A method for assembling a mirror reflective element sub-assembly for a vehicular exterior rearview mirror assembly, the method comprising:
   assembling an indicator module, wherein assembling the indicator module comprises:
   (i) providing a housing;
   (ii) disposing a printed circuit board at a receiving part at the housing;
   (iii) placing the housing, with the printed circuit board disposed at the receiving part, at a heat staking fixture;
   (iv) with the housing at the heat staking fixture, heat staking the printed circuit board at the receiving part of the housing to form a housing and printed circuit board assembly;
   (v) placing the housing and printed circuit board assembly at a potting tray;
   (vi) with the housing and printed circuit board assembly at the potting tray, dispensing potting material at the printed circuit board to seal the printed circuit board at the housing;
   (vii) moving the housing and printed circuit board assembly, with potting material dispensed thereat, to a taping fixture; and
   (viii) with the housing and printed circuit board assembly, with potting material dispensed thereat, at the taping fixture, aligning and taping a diffuser at the housing;
   providing a support fixture;
   providing a back plate, the back plate having an indicator attaching portion for attaching the indicator module, wherein the back plate has an aperture at the indicator attaching portion;
   placing the back plate at the support fixture;
   with the back plate placed at the support fixture, attaching a mirror reflective element at the back plate, wherein the mirror reflective element has a mirror reflector coated at a surface thereof; and
   attaching the indicator module at the indicator attaching portion of the back plate, wherein light emitted by the indicator module, when electrically powered to emit light, passes through the mirror reflective element at the aperture of the back plate.

2. The method of claim 1, wherein the diffuser of the indicator module comprises a diffuser attachment tape, a diffuser element, a mask and a release liner.

3. The method of claim 2, wherein taping the diffuser at the housing comprises removing the release liner and taping the indicator module at the housing.

4. The method of claim 1, further comprising attaching a heater pad at the back plate, wherein attaching the mirror reflective element at the back plate comprises attaching the mirror reflective element to the heater pad attached at the back plate.

5. The method of claim 4, wherein attaching the heater pad at the back plate comprises providing the heater pad at the support fixture, whereby locator pins of the support fixture are received through corresponding locating-apertures of the heater pad to align the heater pad at the support fixture, and wherein the heater pad comprises an indicator aperture that is aligned with the aperture at the indicator attaching portion of the back plate when the heater pad is attached at the back plate.

6. The method of claim 5, wherein the locator pins of the support fixture are received in corresponding locating-apertures of the back plate to align the back plate at the heater pad at the support fixture.

7. The method of claim 6, wherein an indicator icon is laser ablated through the mirror reflector at the aperture of the back plate after the heater pad is attached at the back plate and after the mirror reflective element is attached to the heater pad.

8. The method of claim 7, wherein the indicator icon is laser ablated through the mirror reflector with the mirror reflective element and back plate and heater pad construction located at a laser ablation fixture having locator pins that are received through the locating-apertures of the back plate to align the mirror reflective element and back plate and heater pad construction at the laser ablation fixture.

9. The method of claim 8, wherein, after the indicator icon is laser ablated through the mirror reflector, the mirror reflective element and back plate and heater pad construction is removed from the laser ablation fixture and the indicator module is attached at the indicator attaching portion of the back plate, whereby the indicator module, when attached at the indicator attaching portion of the back plate, is aligned with the indicator icon laser ablated through the mirror reflector.

10. The method of claim 5, wherein the mirror reflector is established at the surface of the mirror reflective element that is opposite from the surface that opposes the heater pad.

11. The method of claim 5, wherein the mirror reflector is established at the surface of the mirror reflective element that opposes the heater pad.

12. The method of claim 5, wherein attaching the heater pad at the back plate comprises removing a liner from the heater pad to expose an adhesive at the heater pad before the back plate is provided at the heater pad and support fixture.

13. The method of claim 5, wherein attaching the mirror reflective element to the heater pad comprises removing a liner from the heater pad to expose an adhesive at the heater pad and pressing the mirror reflective element against the adhesive at the heater pad.

14. The method of claim 1, wherein the mirror reflective element has an indicator icon laser ablated through the mirror reflector, and wherein the indicator icon is aligned with the aperture at the indicator attaching portion of the back plate when the mirror reflective element is attached at the back plate.

15. The method of claim 1, wherein attaching the indicator module at the indicator attaching portion of the back plate comprises snap-attaching the indicator module at the indicator attaching portion of the back plate.

16. The method of claim 1, wherein the indicator attaching portion comprises a wall structure that at least partially receives the indicator module therein.

17. The method of claim 1, wherein the indicator module comprises a blind spot indicator module.

18. A method for assembling a mirror reflective element sub-assembly for a vehicular exterior rearview mirror assembly, the method comprising:
assembling an indicator module, wherein assembling the indicator module comprises:
(i) providing a housing;
(ii) disposing a printed circuit board at a receiving part at the housing;
(iii) placing the housing, with the printed circuit board disposed at the receiving part, at a heat staking fixture;
(iv) with the housing at the heat staking fixture, heat staking the printed circuit board at the receiving part of the housing to form a housing and printed circuit board assembly;
(v) placing the housing and printed circuit board assembly at a potting tray;
(vi) with the housing and printed circuit board assembly at the potting tray, dispensing potting material at the printed circuit board to seal the printed circuit board at the housing;
(vii) moving the housing and printed circuit board assembly, with potting material dispensed thereat, to a taping fixture; and
(viii) with the housing and printed circuit board assembly, with potting material dispensed thereat, at the taping fixture, aligning and taping a diffuser at the housing;
providing a support fixture;
providing a back plate, the back plate having an indicator attaching portion for attaching the indicator module, wherein the indicator attaching portion comprises a wall structure that at least partially receives the indicator module therein, and wherein the back plate has an aperture at the indicator attaching portion;
placing the back plate at the support fixture;
with the back plate placed at the support fixture, attaching a heater pad at the back plate, wherein the heater pad comprises an indicator aperture that is aligned with the aperture at the indicator attaching portion of the back plate when the heater pad is attached at the back plate;
with the back plate placed at the support fixture, attaching a mirror reflective element to the heater pad attached at the back plate, wherein the mirror reflective element has a mirror reflector coated at a surface thereof; and
attaching the indicator module at the indicator attaching portion of the back plate, wherein light emitted by the indicator module, when electrically powered to emit light, passes through the mirror reflective element at the aperture of the back plate.

19. The method of claim 18, wherein the diffuser of the indicator module comprises a diffuser attachment tape, a diffuser element, a mask and a release liner.

20. The method of claim 19, wherein taping the diffuser at the housing comprises removing the release liner and taping the indicator module at the housing.

21. The method of claim 18, wherein attaching the heater pad at the back plate comprises providing the heater pad at the support fixture, whereby locator pins of the support fixture are received through corresponding locating-apertures of the heater pad to align the heater pad at the support fixture.

22. The method of claim 21, wherein the locator pins of the support fixture are received in corresponding locating-apertures of the back plate to align the back plate at the heater pad at the support fixture.

23. The method of claim 22, wherein an indicator icon is laser ablated through the mirror reflector at the aperture of the back plate after the heater pad is attached at the back plate and after the mirror reflective element is attached to the heater pad.

24. The method of claim 23, wherein the indicator icon is laser ablated through the mirror reflector with the mirror reflective element and back plate and heater pad construction located at a laser ablation fixture having locator pins that are received through the locating-apertures of the back plate to align the mirror reflective element and back plate and heater pad construction at the laser ablation fixture.

25. The method of claim 24, wherein, after the indicator icon is laser ablated through the mirror reflector, the mirror reflective element and back plate and heater pad construction is removed from the laser ablation fixture and the indicator module is attached at the indicator attaching portion of the back plate, whereby the indicator module, when attached at the indicator attaching portion of the back plate, is aligned with the indicator icon laser ablated through the mirror reflector.

26. The method of claim 18, wherein the mirror reflector is established at the surface of the mirror reflective element that is opposite from the surface that opposes the heater pad.

27. The method of claim 18, wherein the mirror reflector is established at the surface of the mirror reflective element that opposes the heater pad.

28. The method of claim 18, wherein attaching the heater pad at the back plate comprises removing a liner from the heater pad to expose an adhesive at the heater pad before the back plate is provided at the heater pad and support fixture.

29. The method of claim 18, wherein attaching the mirror reflective element to the heater pad comprises removing a liner from the heater pad to expose an adhesive at the heater pad and pressing the mirror reflective element against the adhesive at the heater pad.

30. The method of claim 18, wherein the mirror reflective element has an indicator icon laser ablated through the mirror reflector, and wherein the indicator icon is aligned with the aperture at the indicator attaching portion of the back plate when the mirror reflective element is attached at the back plate.

31. The method of claim 18, wherein attaching the indicator module at the indicator attaching portion of the back plate comprises snap-attaching the indicator module at the indicator attaching portion of the back plate.

32. The method of claim 18, wherein the indicator module comprises a blind spot indicator module.

33. A method for assembling a mirror reflective element sub-assembly for a vehicular exterior rearview mirror assembly, the method comprising:
assembling a blind spot indicator module, wherein assembling the blind spot indicator module comprises:
(i) providing a housing;
(ii) disposing a printed circuit board at a receiving part of the housing;
(iii) placing the housing, with the printed circuit board disposed at the receiving part, at a heat staking fixture;
(iv) with the housing at the heat staking fixture, heat staking the printed circuit board at the receiving part of the housing to form a housing and printed circuit board assembly;
(v) placing the housing and printed circuit board assembly at a potting tray;

(vi) with the housing and printed circuit board assembly at the potting tray, dispensing potting material at the printed circuit board to seal the printed circuit board at the housing;

(vii) moving the housing and printed circuit board assembly, with potting material dispensed thereat, to a taping fixture; and (viii) with the housing and printed circuit board assembly, with potting material dispensed thereat, at the taping fixture, aligning and taping a diffuser at the housing;

providing a support fixture;

providing a back plate, the back plate having an indicator attaching portion for attaching the blind spot indicator module, wherein the indicator attaching portion comprises a wall structure that at least partially receives the blind spot indicator module therein, and wherein the back plate has an aperture at the indicator attaching portion;

placing the back plate at the support fixture;

with the back plate placed at the support fixture, attaching a mirror reflective element at the back plate, wherein the mirror reflective element has a mirror reflector coated at a surface thereof; and snap-attaching the blind spot indicator module at the indicator attaching portion of the back plate, wherein light emitted by the blind spot indicator module, when electrically powered to emit light, passes through the mirror reflective element at the aperture of the back plate.

34. The method of claim 33, wherein the diffuser of the blind spot indicator module comprises a diffuser attachment tape, a diffuser element, a mask and a release liner.

35. The method of claim 34, wherein taping the diffuser at the housing comprises removing the release liner and taping the blind spot indicator module at the housing.

36. The method of claim 33, further comprising attaching a heater pad at the back plate, wherein attaching the mirror reflective element at the back plate comprises attaching the mirror reflective element to the heater pad attached at the back plate.

37. The method of claim 36, wherein attaching the heater pad at the back plate comprises providing the heater pad at the support fixture, whereby locator pins of the support fixture are received through corresponding locating-apertures of the heater pad to align the heater pad at the support fixture, and wherein the heater pad comprises an indicator aperture that is aligned with the aperture at the indicator attaching portion of the back plate when the heater pad is attached at the back plate.

38. The method of claim 37, wherein the locator pins of the support fixture are received in corresponding locating-apertures of the back plate to align the back plate at the heater pad at the support fixture.

39. The method of claim 38, wherein an indicator icon is laser ablated through the mirror reflector at the aperture of the back plate after the heater pad is attached at the back plate and after the mirror reflective element is attached to the heater pad.

40. The method of claim 39, wherein the indicator icon is laser ablated through the mirror reflector with the mirror reflective element and back plate and heater pad construction located at a laser ablation fixture having locator pins that are received through the locating-apertures of the back plate to align the mirror reflective element and back plate and heater pad construction at the laser ablation fixture.

41. The method of claim 40, wherein, after the indicator icon is laser ablated through the mirror reflector, the mirror reflective element and back plate and heater pad construction is removed from the laser ablation fixture and the blind spot indicator module is snap-attached at the indicator attaching portion of the back plate, whereby the blind spot indicator module, when snap-attached at the indicator attaching portion of the back plate, is aligned with the indicator icon laser ablated through the mirror reflector.

42. The method of claim 37, wherein the mirror reflector is established at the surface of the mirror reflective element that is opposite from the surface that opposes the heater pad.

43. The method of claim 37, wherein the mirror reflector is established at the surface of the mirror reflective element that opposes the heater pad.

44. The method of claim 37, wherein attaching the heater pad at the back plate comprises removing a liner from the heater pad to expose an adhesive at the heater pad before the back plate is provided at the heater pad and support fixture.

45. The method of claim 37, wherein attaching the mirror reflective element to the heater pad comprises removing a liner from the heater pad to expose an adhesive at the heater pad and pressing the mirror reflective element against the adhesive at the heater pad.

46. The method of claim 33, wherein the mirror reflective element has an indicator icon laser ablated through the mirror reflector, and wherein the indicator icon is aligned with the aperture at the indicator attaching portion of the back plate when the mirror reflective element is attached at the back plate.

* * * * *